US008506413B2

(12) United States Patent
Suzuki et al.

(10) Patent No.: US 8,506,413 B2
(45) Date of Patent: Aug. 13, 2013

(54) ROTARY CONNECTOR

(75) Inventors: Norihito Suzuki, Makinohara (JP); Hideki Adachi, Makinohara (JP); Tsutomu Sawada, Makinohara (JP)

(73) Assignee: Yazaki Corporation, Tokyo (JP)

( * ) Notice: Subject to any disclaimer, the term of this patent is extended or adjusted under 35 U.S.C. 154(b) by 245 days.

(21) Appl. No.: 12/694,571

(22) Filed: Jan. 27, 2010

(65) Prior Publication Data

US 2010/0190557 A1  Jul. 29, 2010

(30) Foreign Application Priority Data

Jan. 29, 2009  (JP) ................................. 2009-018354

(51) Int. Cl.
*F16D 3/16* (2006.01)

(52) U.S. Cl.
USPC .............................. 464/23; 464/106; 464/147

(58) Field of Classification Search
USPC .................. 464/106, 23, 147, 149, 150, 151, 464/139, 110; 74/492; 324/207.12, 207.25; 180/443; 439/15, 164
See application file for complete search history.

(56) References Cited

U.S. PATENT DOCUMENTS

| | | | | |
|---|---|---|---|---|
| 5,073,145 A | * | 12/1991 | Ratzokwski et al. ..... | 464/106 X |
| 6,252,394 B1 | * | 6/2001 | Roze et al. ............... | 324/207.12 |
| 6,272,912 B1 | * | 8/2001 | Sano | |
| 6,568,696 B2 | * | 5/2003 | Osborn et al. | |
| 6,988,027 B2 | * | 1/2006 | Yuda et al. ................ | 180/443 X |
| 7,223,104 B2 | * | 5/2007 | Suenaga .......................... | 439/15 |
| 7,798,816 B2 | * | 9/2010 | Oishi .............................. | 439/15 |
| 7,811,108 B2 | * | 10/2010 | Oishi et al. ..................... | 439/164 |
| 7,992,672 B2 | * | 8/2011 | Shimizu | |
| 8,008,910 B2 | * | 8/2011 | Booth et al. ......... | 324/207.25 X |
| 2006/0272430 A1 | * | 12/2006 | Araki et al. | |
| 2006/0283271 A1 | * | 12/2006 | Araki et al. | |
| 2008/0003853 A1 | * | 1/2008 | Tanaka et al. ................. | 439/164 |
| 2009/0218162 A1 | * | 9/2009 | Miyoshi et al. .............. | 180/443 |
| 2011/0011667 A1 | * | 1/2011 | Kang | |
| 2011/0067981 A1 | * | 3/2011 | Kusama | |
| 2011/0127104 A1 | * | 6/2011 | Shibahata | |

FOREIGN PATENT DOCUMENTS

| | | | | |
|---|---|---|---|---|
| GB | 2184202 A | * | 6/1987 | ................... 464/106 |
| JP | 2003-212129 A | | 7/2003 | |

* cited by examiner

*Primary Examiner* — Gregory Binda
*Assistant Examiner* — Matthieu Setliff
(74) *Attorney, Agent, or Firm* — Sughrue Mion, PLLC

(57) ABSTRACT

A rotary connector, comprises an annular rotary body inserted outside a steering shaft and integrally rotated with a steering wheel, a rotator of a steering angle sensor inserted outside the steering shaft; and a tubular joint inserted outside the steering shaft and connecting the rotary body to the rotator; wherein the rotary body and the joint are connected together by a first universal joint, and the joint and the rotator are connected together by a second universal joint.

7 Claims, 15 Drawing Sheets

ROTARY CONNECTOR

BACKGROUND OF THE INVENTION

1. Field of the Invention

The present invention relates to a rotary connector in which a rotary body and a rotator can be separately positioned without generating a rotation error.

2. Description of the Related Art

There are provided, around a steering shaft, a steering connection cable for transmitting electric signals to a squib on a steering wheel, a combination switch provided with a switch lever for a turn signal, a head lamp etc., and further, a steering angle sensor for inputting signals to a shock absorber damping force control device or a swivel device, and so on (Reference should be made to Patent Document 1, for example).

As shown in FIG. 16, in case where a rotary connector 501 provided with the steering connection cables, a combination switch 503, and a steering angle sensor 505 are arranged, in an automobile in which a relatively large space can be easily secured in a direction a perpendicular to a steering shaft 507, a large space 509 has been secured in a lower part from a floor of a vehicle room to the combination switch 503, by arranging the rotary connector 501 and the steering angle sensor 505 inside the combination switch 503.

Patent Document 1: JP-A-2003-212129

However, in a vehicle such as a truck, although a relatively large space can be easily secured in the lower space 509 from the floor of the vehicle room to the combination switch 503, in contrast with the automobile, it is required to reduce a size A for containing instruments, because it is desired to secure a sufficient space in the direction a perpendicular to the steering shaft 507. Therefore, such a structure of a steering column that the rotary connector 501 and the steering angle sensor 505 which have been heretofore arranged inside the combination switch 503 are so arranged as to sandwich the combination switch 503 in a vertical direction, thereby to reduce the size A for containing the instruments is considered as advantageous. However, because a rotary body (not shown) that is integrally rotated with a steering wheel 511 (for example, a canceller) passes through the combination switch 503 to be connected to a rotator of the steering angle sensor 505, a length b in an axial direction is made longer. When the length b of the rotary body in the axial direction is made longer, a difference in angular velocity (a rotation error) between the rotary body and the rotator becomes prominent, in case where an axial deviation has occurred between both rotation centers of the rotary body and the rotator due to assembling tolerances of the instruments. As the results, there is a problem that accuracy of the signals to be inputted to the above-described devices may be deteriorated.

SUMMARY OF THE INVENTION

The invention has been made in view of the above-described circumstances, and it is an object of the invention to provide a rotary connector in which a rotation error between a rotary body and a rotator can be eliminated, even though an axial deviation has occurred between the rotary body and the rotator.

A first aspect of the invention provides with a rotary connector, comprising an annular rotary body inserted outside a steering shaft and integrally rotated with a steering wheel; a rotator of a steering angle sensor inserted outside the steering shaft; and a tubular joint inserted outside the steering shaft and connecting the rotary body to the rotator; wherein the rotary body and the joint are connected together by a first universal joint, and the joint and the rotator are connected together by a second universal joint.

According to the first aspect, when an axial deviation occurs between the rotary body and the rotator, the rotator and the joint are connected together at a certain angle of intersection by means of the first universal joint, and the joint and the rotator are connected together at an opposite angle of intersection by means of the second universal joint. In this manner, even though the axial deviation has occurred between the rotary body and the rotator, both the rotation axes of the rotary body and the rotator becomes parallel, and a difference in the angular velocity (a rotation error) comes to zero.

A second aspect of the invention provides with the rotary connector, in which the first universal joint includes opposed walls provided near an outer periphery of the rotary body at both ends of the rotary body in a diametrical direction, extending in parallel in a direction along an axis of the rotary body; sliding contact projections respectively formed between the opposed walls, a pair of clamping pieces, provided inside one end side of the joint, at both ends of in a diametrical direction, and respectively clamping the sliding contact projections from outside, and disc-shaped parts, formed in proximity of the clamping pieces, and adapted to be engaged between the opposed walls in parallel to each other.

According to the second aspect of the invention, a pair of the sliding contact projections which are provided on the outer periphery of the rotary body at both ends thereof in the diametrical direction are clamped between a pair of the clamping pieces which are provided at the one end of the joint, whereby the rotary body and the joint can be rotated around a diameter perpendicular to a diameter passing a pair of the sliding contact projections within a determined angle range. Moreover, the disc-shaped parts of the joint are engaged between a pair of the opposed walls provided on the rotary body, whereby the rotary body and the joint can be rotated around a diameter passing a pair of the disc-shaped parts within a determined angle range. In this manner, the rotary body and the joint of which the two rotation centers intersect are connected to each other so that the rotation can be transmitted.

A third aspect of the invention provides with the rotary connector in which the second universal joint includes bearing parts, provided inside the other end of the joint at both ends in a diametrical direction, and respectively having bearing faces in parallel which are cut out in an axial direction of the joint, and a pair of shaft parts, provided on an inner peripheral face of the rotator so as to project inward from both ends in a diametrical direction, and adapted to be engaged with the bearing parts.

According to the third aspect of the in invention, a pair of the shaft parts of the rotator are engaged with a pair of the bearing parts formed at the other end of the joint, whereby the joint and the rotator can be rotated around a diameter passing a pair of the shaft parts within a determined angle range. Moreover, because a pair of the shaft parts respectively slide relative to each other along bearing faces of the bearing parts in opposite directions in the axial direction, whereby the joint and the rotator can be rotated around a diameter perpendicular to a diameter passing a pair of the shaft parts within a determined angle range. In this manner, the rotator and the joint of which the two rotation centers intersect are connected to each other so that the rotation can be transmitted.

A fourth aspect of the invention provides with sliding contact faces of the sliding contact projections and clamping faces of the clamping pieces are formed in a spherical shape.

According to the fourth aspect, the sliding contact projections and the clamping pieces can be smoothly rotated by bringing their spherical faces into sliding contact, both in a rotation direction around the diameter perpendicular to the diameter passing a pair of sliding contact projection, and in a rotation direction around the diameter passing a pair of the sliding contact projections.

A fifth aspect of the invention provides with the rotary connector in which an R face is formed on an outer periphery of each of the shaft parts at an equal distance from a certain point on the axis, and the shaft part is brought into contact with the bearing face at the R face.

According to this rotary connector, the bearing faces of the bearing parts of the joint can slide along the R faces of the shaft parts, and the joint can be displaced on the inner periphery of the rotator in a direction of becoming eccentric with respect to the center of the rotator. In this manner, it is possible to eliminate occurrence of interference during the displacement, which occurs in case where the shaft parts are the angled pin or the equal diameter pins, and it becomes unnecessary to enlarge a clearance for the purpose of avoiding the interference.

According to the rotary connector of the invention, it is possible to eliminate the rotation error between the rotary body and the rotator, even though the axial deviation has occurred between the rotary body and the rotator, because the rotary body is coupled to the rotator by way of the joint, the rotary body is connected to the joint by means of the first universal joint, and at the same time, the joint is connected to the rotator by means of the second universal joint.

DESCRIPTION OF THE PREFERRED EMBODIMENTS

Figure 1:
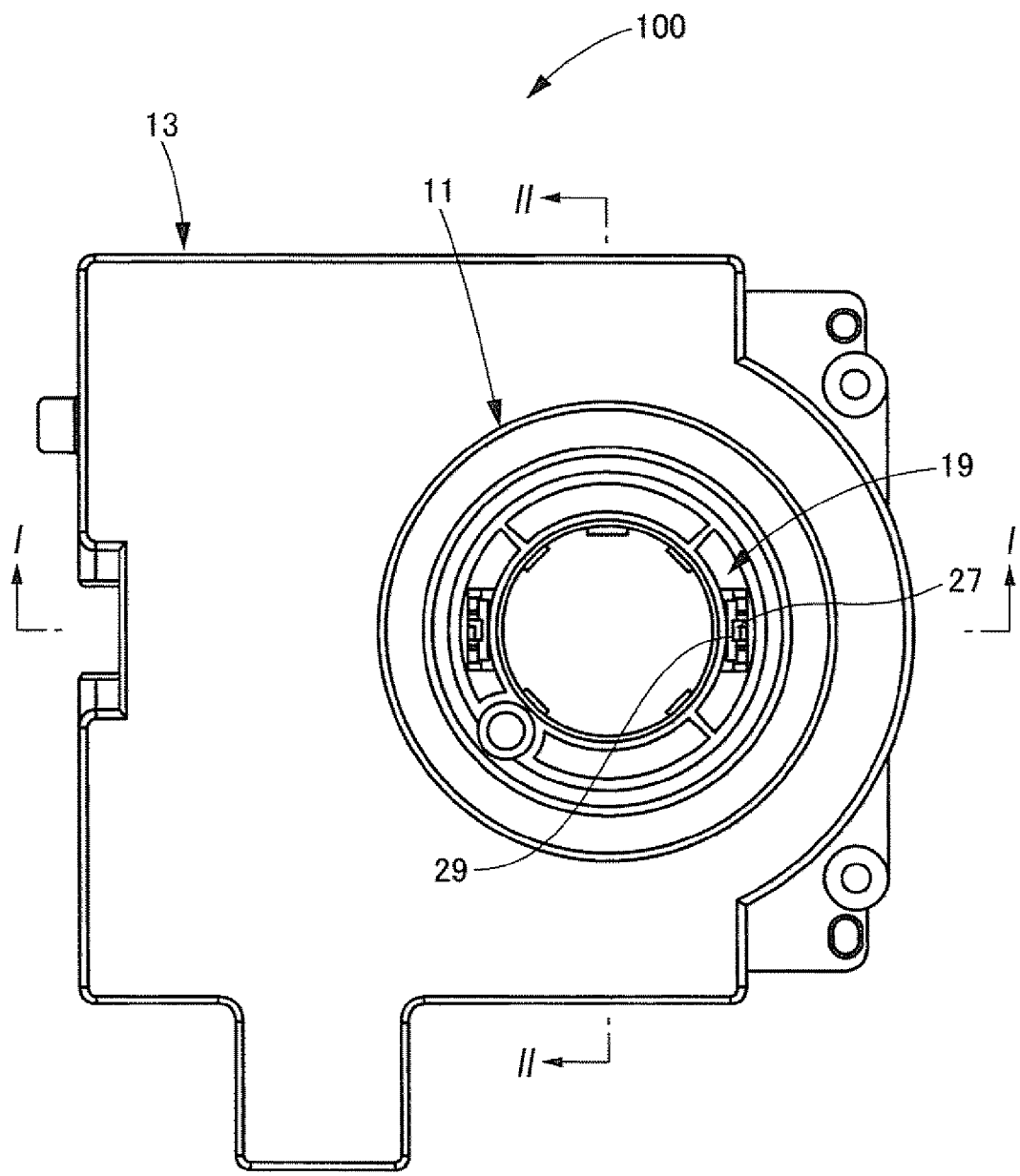
FIG. 1 is a plan view of a rotary connector according to the invention.

Now, the rotary connector in a preferred embodiment according to the invention will be described, referring to the drawings.

Figure 2:
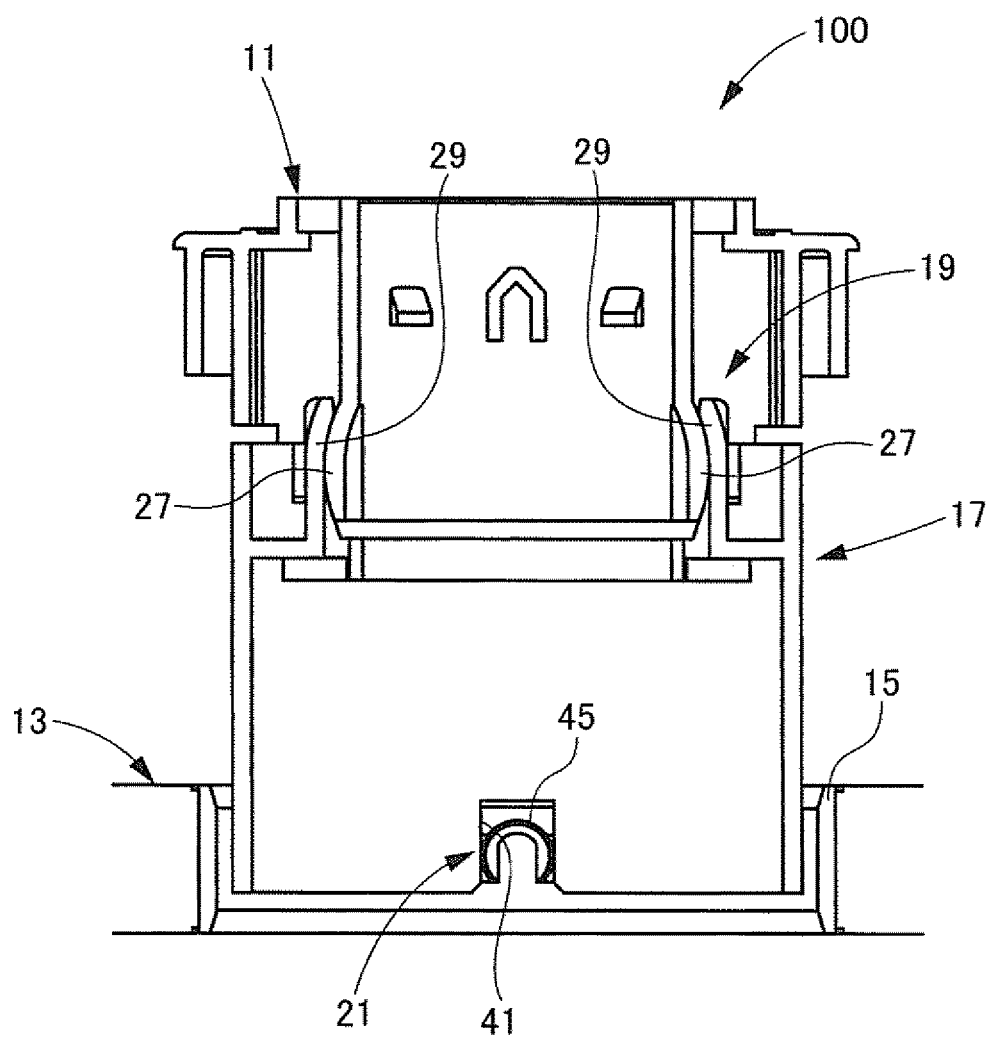
FIG. 2 is a sectional view taken along a line I-I in FIG. 1.
Figure 3:
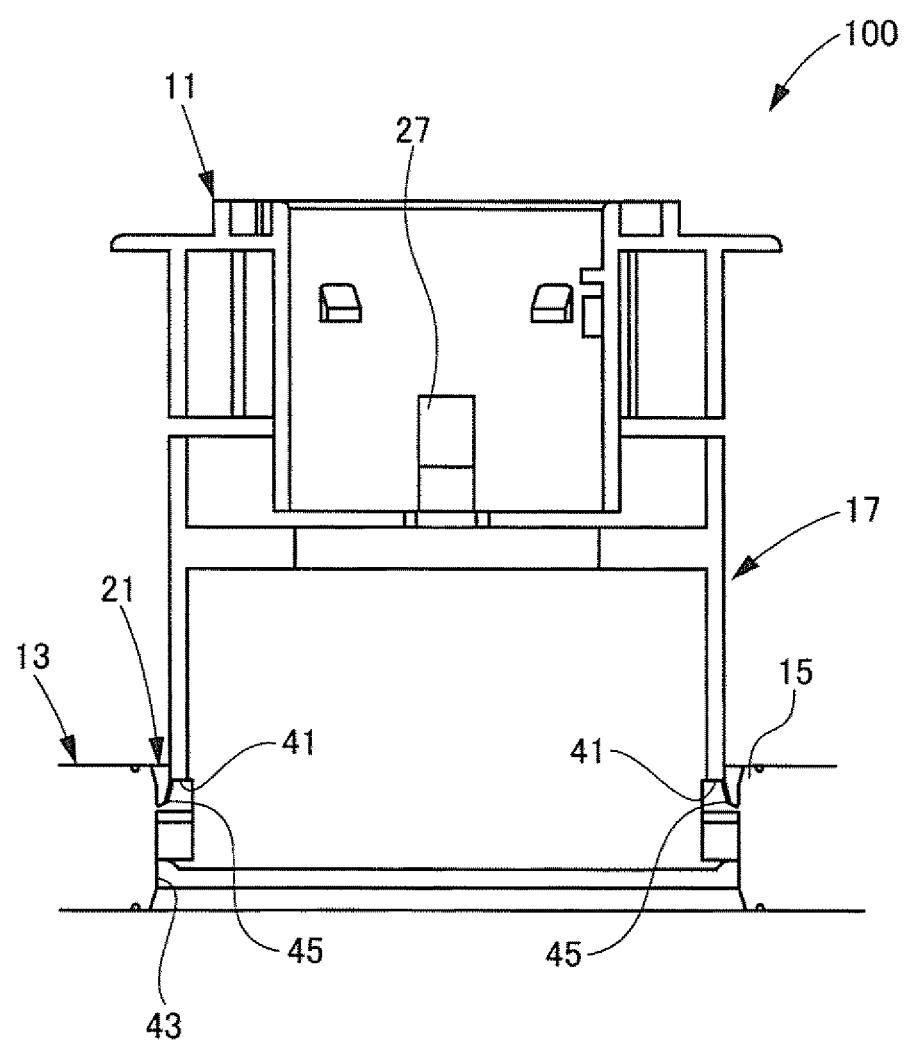
FIG. 3 is a sectional view taken along a line II-II in FIG. 1.

FIG. 1 is a plan view of a rotary connector according to the invention, FIG. 2 is a sectional view taken along a line I-I in FIG. 1, and FIG. 3 is a sectional view taken along a line II-II in FIG. 1.

A rotary connector 100 mainly includes a rotary body in an annular shape which is inserted outside (outside insertion) a steering shaft (not shown) so as to surround it, and integrally rotated with a steering wheel (not shown), such as a canceller 11 of a combination switch, for example, a rotator 15 of a steering angle sensor 13 which is inserted outside the steering shaft (See FIG. 2), and a joint 17 in a tubular shape which is inserted outside the steering shaft and connects the canceller 11 to the rotator 15.

The rotary connector 100 is so constructed that when the steering wheel is rotated, the canceller 11 is integrally rotated, and this rotation of the canceller 11 is transmitted to the rotator 15 of the steering angle sensor 13 by way of the joint 17.

A steering connection cable, which is not shown, is contained in a spiral shape in a containing space in a housing of the combination switch so that its one end can be integrally rotated with the canceller 11 and can be rotated to right and left from a steering neutral position by 2.5 times.

The joint 17 that transmits the rotation of the canceller 11 to the steering angle sensor 13 is connected to the canceller 11 by means of a first universal joint 19, and connected to the rotator 15 by means of a second universal joint 21. The universal joint transmits rotation between two members, in case where rotation center axes of the two members intersect within a certain angle range. In this embodiment, the two members of the first universal joint 19 are the canceller 11 and the joint 17, while the two members of the second universal joint 21 are the joint 17 and the rotator 15.

Figure 4:
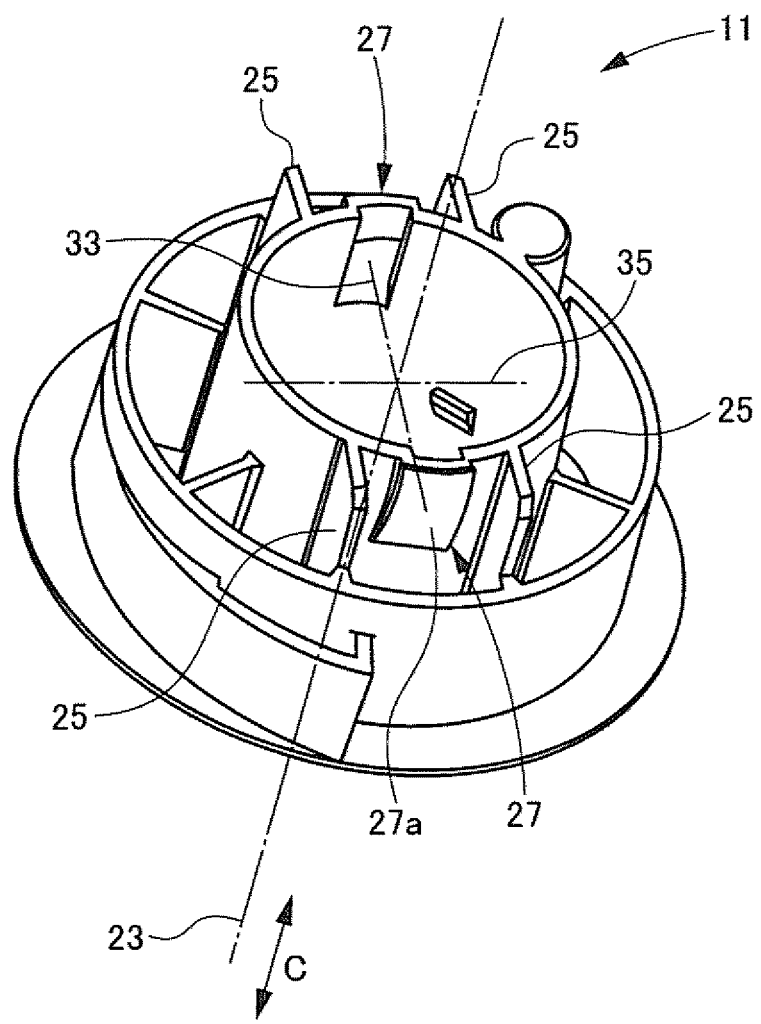
FIG. 4 is a perspective view of a rotary body as seen from below.
Figure 5:
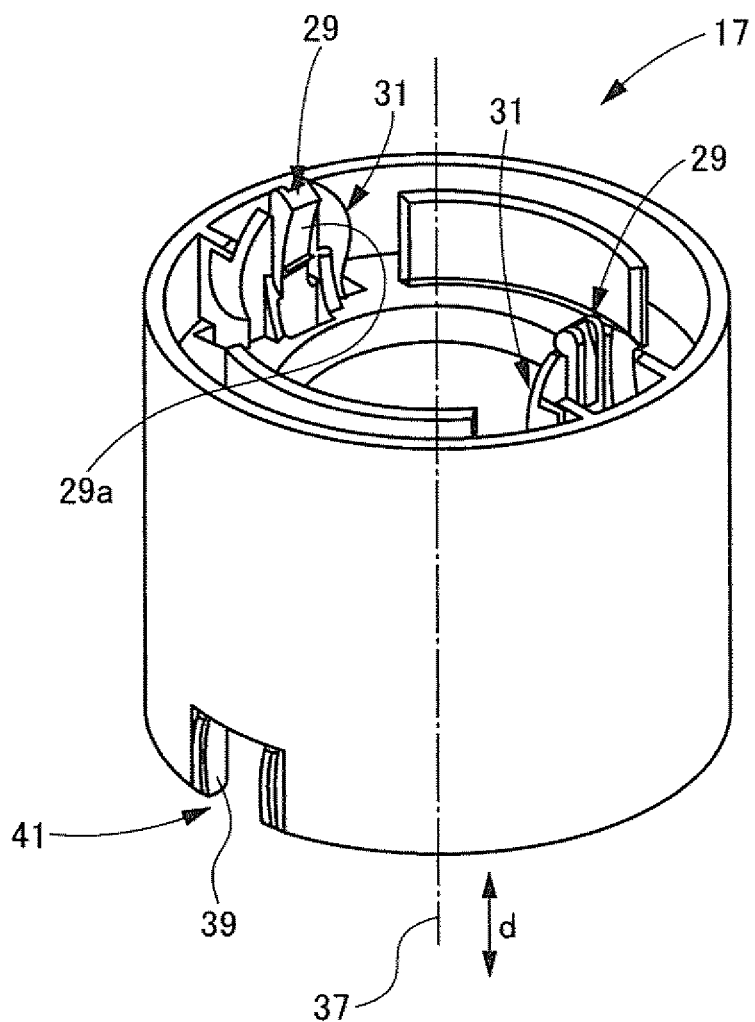
FIG. 5 is a perspective view of a joint.
Figure 6:
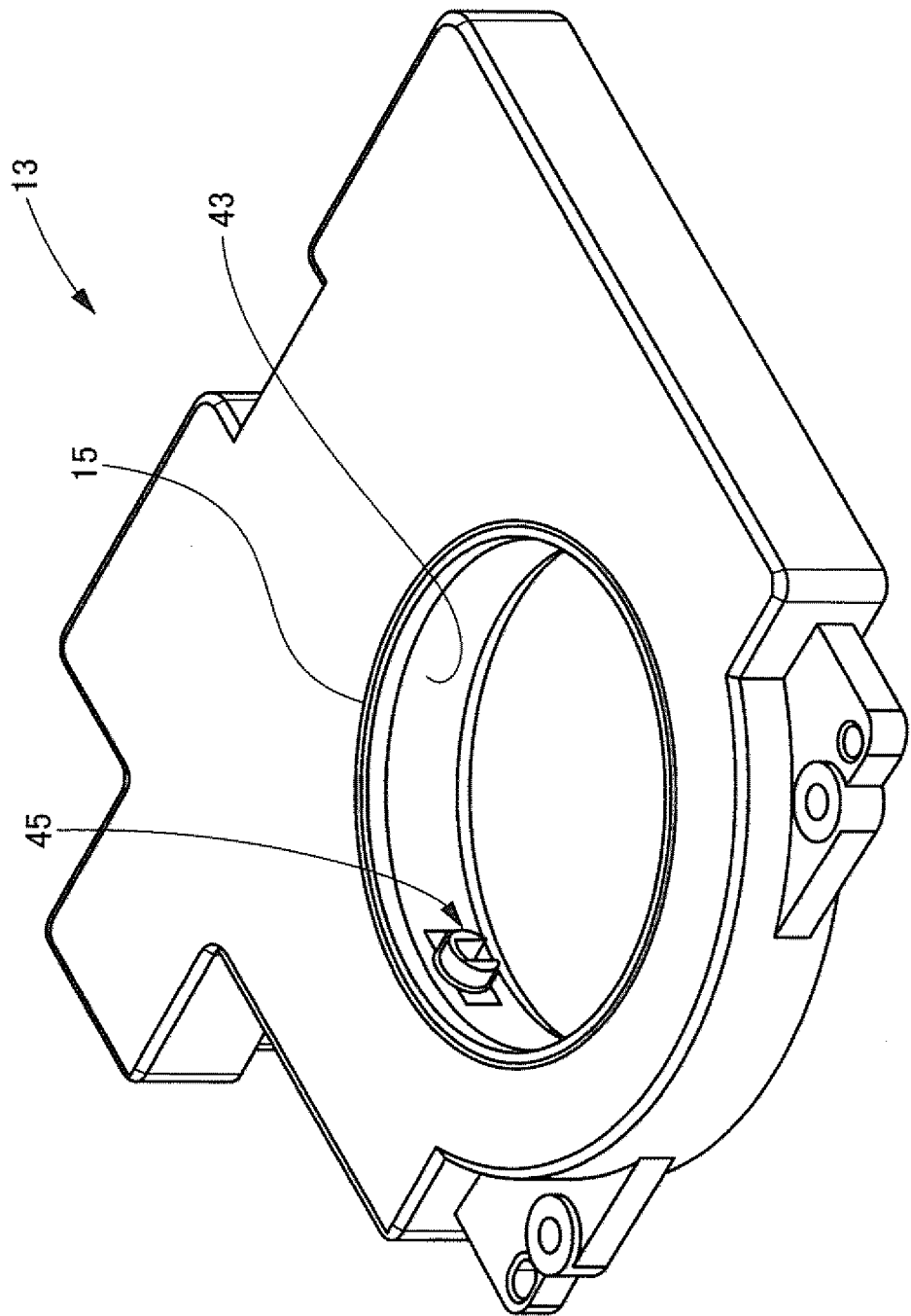
FIG. 6 is a perspective view of a steering angle sensor.

FIG. 4 is a perspective view of the canceller 11 as seen from below, FIG. 5 is a perspective view of the joint, and FIG. 6 is a perspective view of the steering angle sensor.

The first universal joint 19 includes opposed walls 25, 25 which are provided near an outer periphery of the canceller 11 at both ends thereof in a diametrical direction extending in parallel in a direction c along an axis 23, sliding contact projections 27 which are respectively formed between the opposed walls 25, 25, a pair of clamping pieces 29, 29 which are provided inside one end part of the joint 17 at both ends thereof in a diametrical direction so as to clamp the respective sliding contact projections 27, 27 from outside, and disc-shaped parts 31, 31 which are formed in proximity of the clamping pieces 29, 29 to be engaged between the opposed walls 25, 25.

The clamping pieces 29 hold the canceller 11 from outside in the diametrical direction, while bringing their clamping faces 29a into sliding contact with sliding contact faces 27a of the sliding contact projections 27. The disc-shaped parts 31 are engaged between the opposed walls 25, 25, and their outer peripheral faces at both ends in the diametrical direction are brought into sliding contact with inner faces of the opposed walls 25, 25. In short, the canceller 11 and the joint 17 are coupled together so as not to relatively rotate.

The sliding contact faces 27a of the sliding contact projections 27, and the clamping faces 29a of the clamping pieces 29, 29 are formed in a spherical shape. Accordingly, the sliding contact projections 27 and the clamping pieces 29 can be smoothly rotated, because their spherical faces are brought into sliding contact with each other both in a rotation direction around a diameter 35 which is perpendicular to a diameter 33 passing a pair of the sliding contact projections 27, 27, as shown in FIG. 4, and in a rotation direction around the diameter 33.

The second universal joint 21 includes bearing parts 41 having a pair of bearing faces 39, 39 which are provided inside the joint 17 at the other end side at both ends in the diametrical direction, and cut out in a direction d along an axis 37, and a pair of shaft parts 45, 45 which are projected inward from an inner peripheral face 43 of the rotator 15 at both ends in the diametrical direction to be engaged with the respective bearing parts 41, 41.

As shown in FIG. 5, the bearing parts 41, 41 are provided at positions rotated by 90 degree in a circumferential direction of the joint 17 with respect to the clamping pieces 29, 29.

Then, operation of the rotary connector 100 having the above-described structure will be described.

Figure 7:
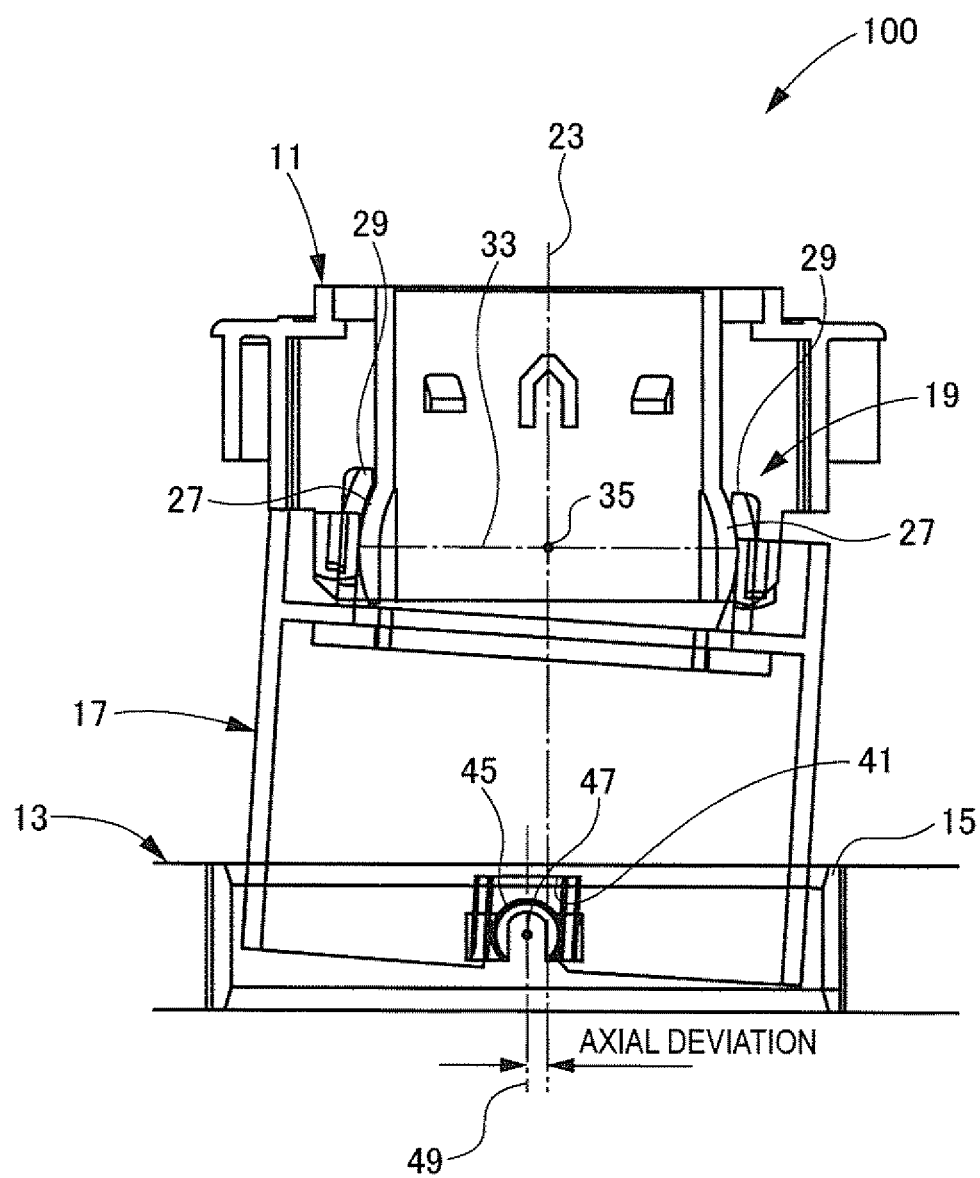
FIG. 7 is a vertical sectional view of the rotary connector in which the rotary body and a rotator are deviated in a direction of a diameter passing a pair of sliding contact projections.

FIG. 7 is a sectional view of the rotary connector 100 in a state where the canceller 11, which is a rotary body, is deviated with respect to the rotator 15 in a direction of the diameter (33) passing a pair of the sliding contact projections 27, 27.

In the first universal joint 19, as shown in FIG. 7, a pair of the sliding contact projections 27, 27 provided on the outer periphery of the canceller 11 at the both ends in the diametrical direction are clamped from outside in a radial direction, by a pair of the clamping pieces 29, 29 provided at the one end of the joint 17, whereby the canceller 11 and the joint 17 can be rotated relative to each other within a determined angle range around the diameter 35 which is perpendicular to the diameter 33 passing a pair of the sliding contact projections 27, 27.

In the second universal joint 21, a pair of the shaft parts 45 of the rotator 15 are engaged with a pair of the bearing parts 41 which are formed at the other end of the joint 17, whereby the joint 17 and the rotator 15 can be rotated around a diameter 47 passing a pair of the shaft parts 45, 45 within a determined angle range.

In this manner, an axial deviation between the axis 23 of the canceller 11 and an axis 49 of the rotator 15 which is deviated in a direction of the diameter 33 can be absorbed by an inclination of the joint 17, and coupling of a rotary transmission system eliminating a difference in angular velocity (a rotation error) can be achieved.

Figure 8:
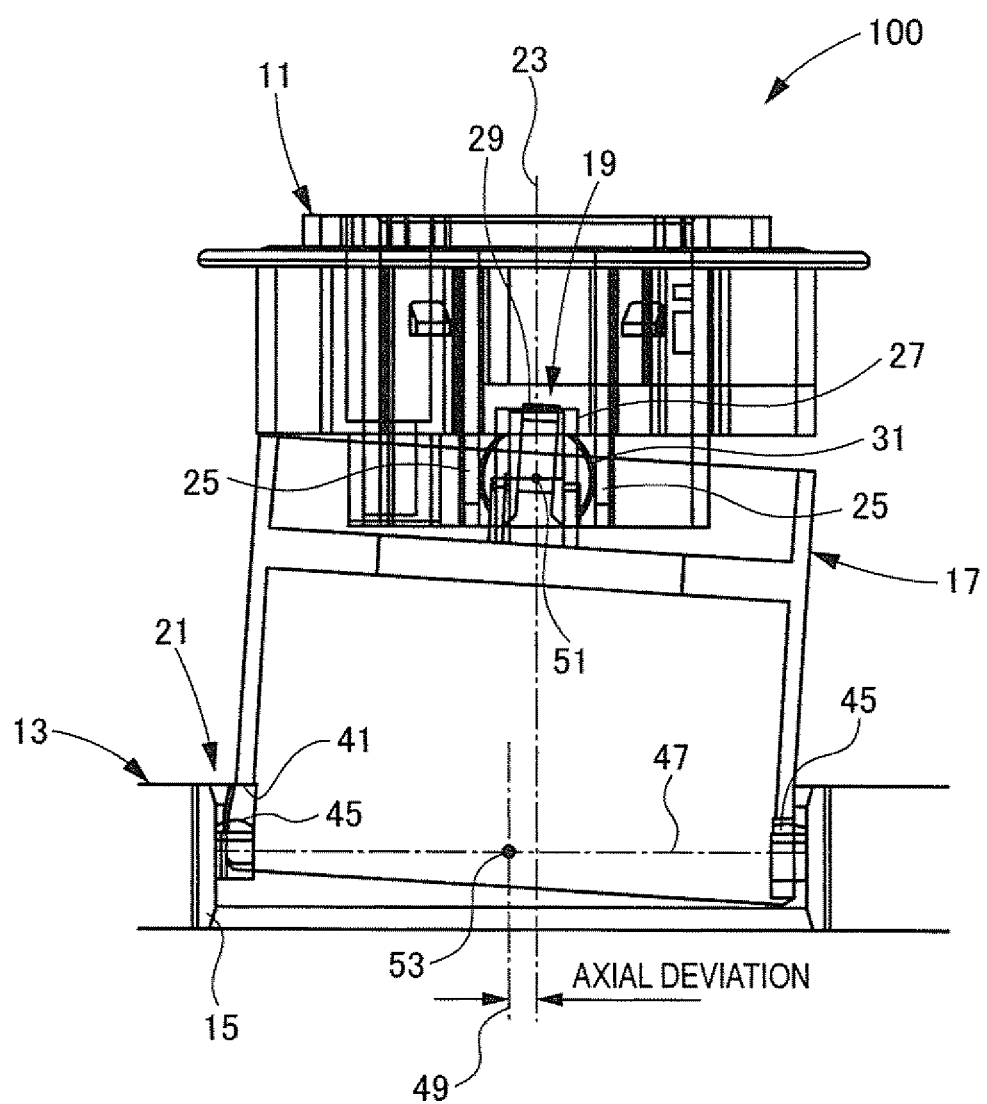
FIG. 8 is a vertical sectional view of the rotary connector in which the rotary body and the rotator are deviated in a direction of a diameter passing a pair of shaft parts.

FIG. 8 is a vertical sectional view of the rotary connector in a state where the canceller 11, which is the rotary body, is deviated with respect to the rotator 15 in a direction of the diameter (47) passing a pair of the shaft parts 45, 45.

In the first universal joint 19, the disc-shaped parts 31, 31 of the joint 17 are engaged between a pair of the opposed walls 25, 25 which are provided in the canceller 11, whereby the canceller 11 and the joint 17 can be rotated around a diameter 51 passing a pair of the disc-shaped parts 31, 31 within a determined angle range.

Further, a pair of the shaft parts 45, 45 of the rotator 15 slide relative to each other along the bearing faces 39, 39 of the bearing parts 41 of the joint 17 in opposite directions along the axis 37 (See FIG. 5), whereby the joint 17 and the rotator 15 can be rotated around a diameter 53 which is perpendicular to the diameter 47 passing a pair of the shaft parts 45, 45 within a determined angle range.

In this manner, an axial deviation between the axis 23 of the canceller 11 and the axis 49 of the rotator 15 which is deviated in a direction of the diameter 47 can be absorbed by an inclination of the joint 17, and coupling of a rotary transmission system eliminating a difference in angular velocity (a rotation error) can be achieved.

Now, structure of a comparative example in which the joint 17 is simply made longer, without providing the above described structure, will be described.

Figure 9A:
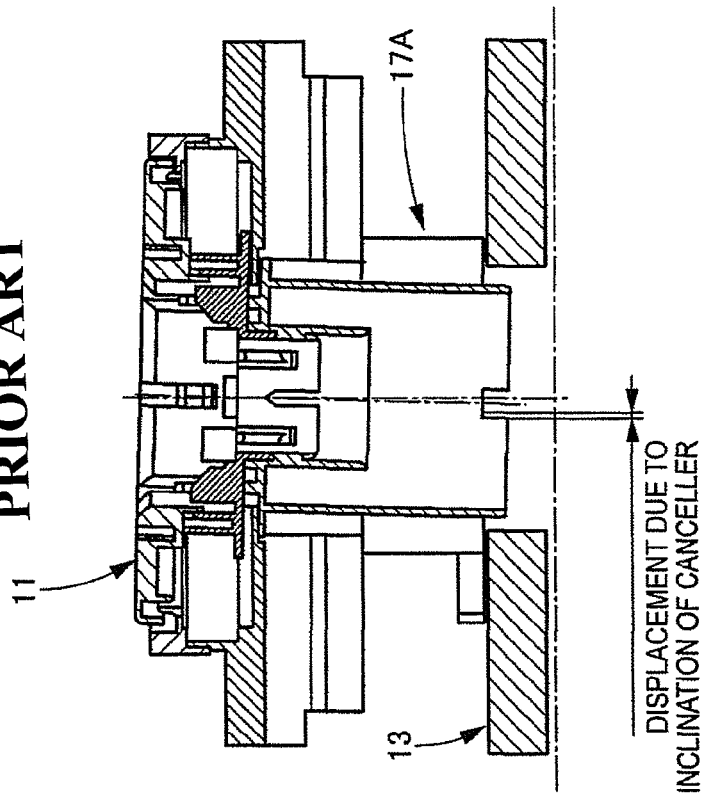
FIG. 9(a) is a vertical sectional view showing an axial deviation in a comparative example in which the rotary body is made longer, and (b) is a vertical sectional view showing an inclined state of the rotary body in the comparative example in which the rotary body is made longer.
Figure 9B:
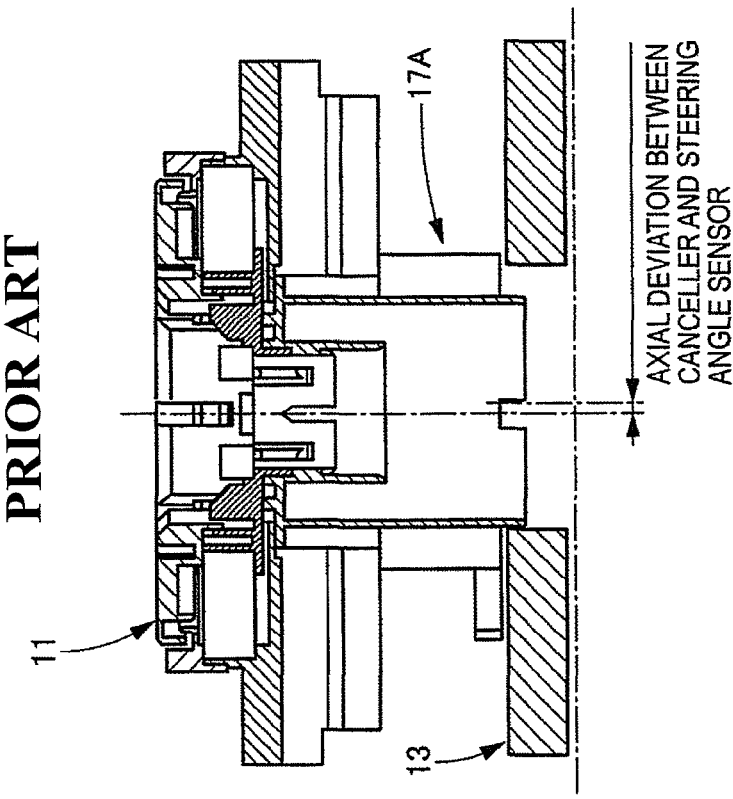
Figure 10:
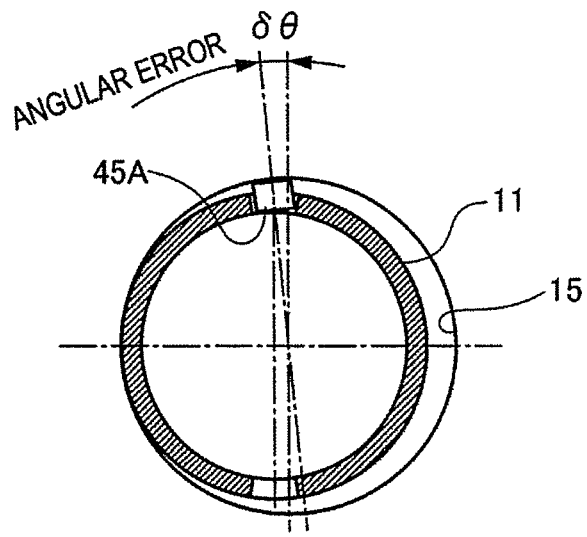
FIG. 10 is a cross sectional view showing a rotation error in a comparative example in which the rotary body and the rotator are connected by one shaft part.
Figure 11:
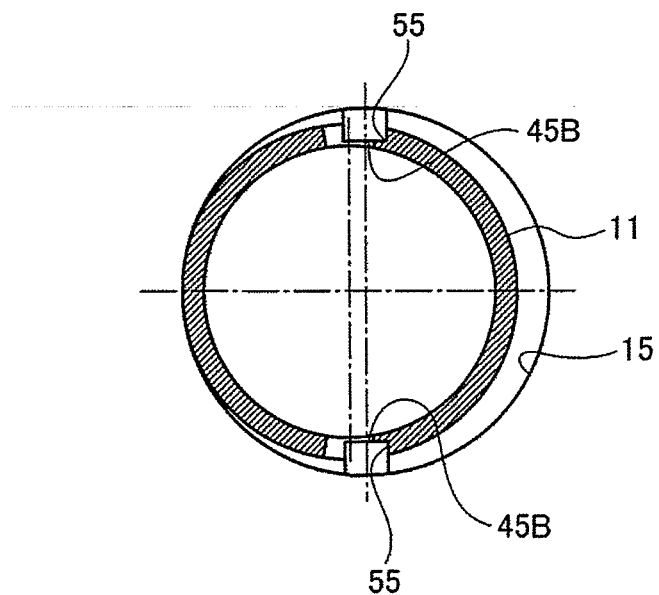
FIG. 11 is a cross sectional view showing a displacement in a direction of axial deviation in a comparative example in which the rotary body and the rotator are connected by two shaft parts.

FIG. 9(a) is a vertical sectional view showing an axial deviation in a comparative example in which the rotary body is made longer, FIG. 9(b) is a vertical sectional view showing an inclined state of the rotary body in the comparative example in which the rotary body is made longer, FIG. 10 is a cross sectional view showing a rotation error in a comparative example in which the rotary body and the rotator are coupled by one shaft part, and FIG. 11 is a cross sectional view showing a displacement in a direction of axial deviation in a comparative example in which the rotary body and the rotator are connected by two shaft parts.

As shown in FIG. 9, in case where the canceller 11 and the steering angle sensor 13 are connected by one shaft part 45A (See FIG. 10) only by the long-length joint 17A, without providing the first universal joint 19 and the second universal joint 21, when an axial deviation occurs between the canceller 11 and the rotator 15 as shown in FIG. 9(a), or when the canceller 11 is inclined as shown in FIG. 9(b), the canceller 11 may be displaced inside the rotator 15 of the steering angle sensor 13, and an angular error δθ (about 2° in this product) is generated between the canceller 11 and the rotator 15, as shown in FIG. 10.

Moreover, in case where the canceller 11 is held by the two shaft parts 45B, 45B, as shown in FIG. 11, displacement of the canceller 11 is restricted inside the rotator 15, and hence, an angular error will not occur. However, because axial deviation cannot be absorbed, there is such anxiety that deviation abrasion 55, abnormal torque, and strange noise may occur.

Figure 12:
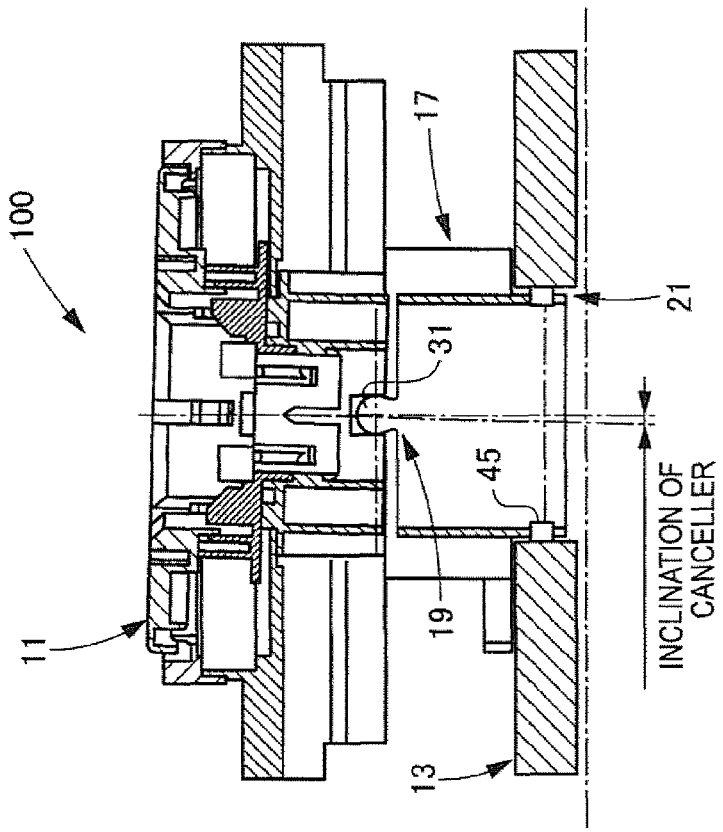
FIG. 12(a) is a vertical sectional view showing an axial deviation in the embodiment, and (b) is a vertical sectional view showing an inclined state of the rotary body in the embodiment.
Figure 12:
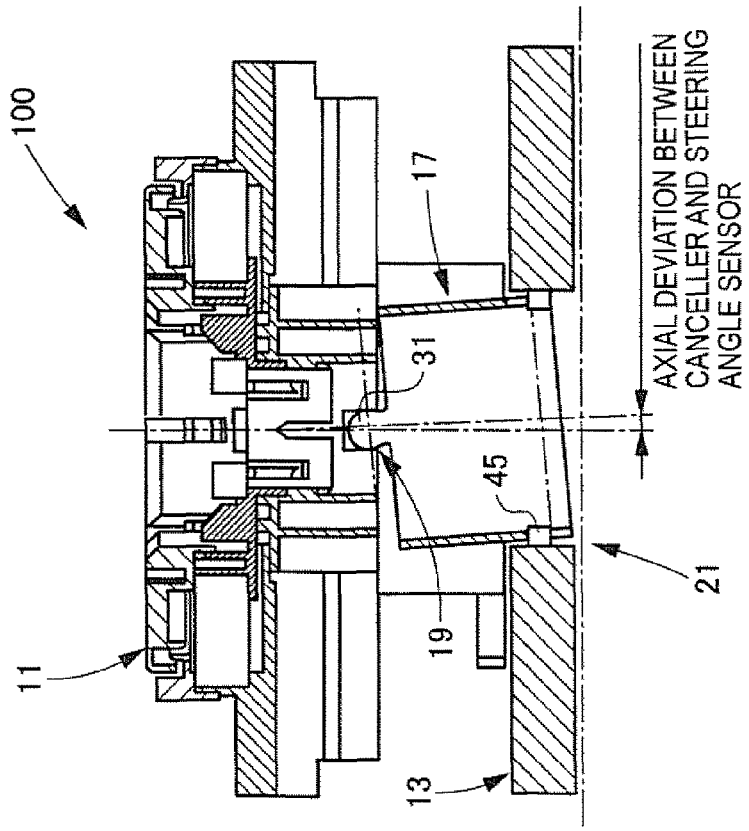
Figure 13:
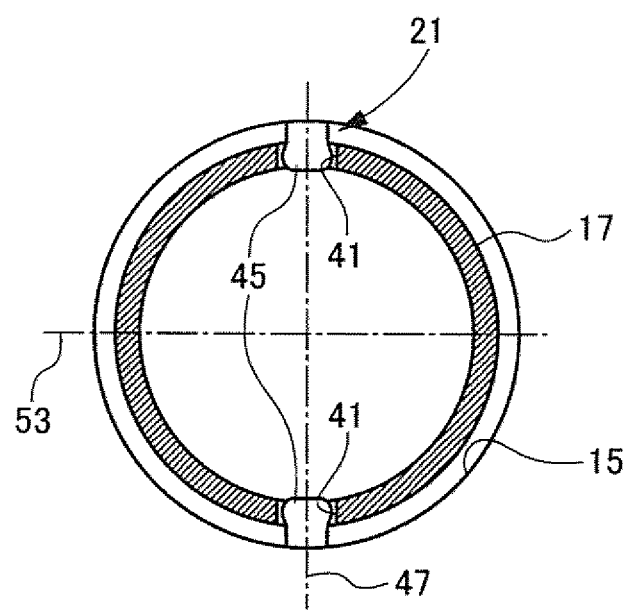
FIG. 13 is a cross sectional view of the joint and the rotator showing a displacement in a direction of axial deviation in the embodiment.

FIG. 12(a) is a vertical sectional view showing an axial deviation in the embodiment, FIG. 12(b) is a vertical sectional view showing an inclined state of the rotary body, and FIG. 13 is a cross sectional view of the joint and the rotator showing a displacement in a direction of axial deviation in the embodiment.

In contrast with the above described comparative examples, in the rotary connector 100 in the embodiment provided with the first universal joint 19 and the second universal joint 21, when an axial deviation occurs between the canceller 11 and the rotator 15 as shown in FIG. 12(a), the axial deviation is absorbed by an inclination of the joint 17, and rotation axes at a driving side (the canceller 11) and at a driven side (the rotator 15) become parallel. In this manner, the joint 17 and the rotator 15 are coaxially arranged, as shown in FIG. 13, and a difference in the angular velocity (a rotation error) comes to zero.

Moreover, in case where the canceller 11 is inclined as shown in FIG. 12(b), the inclination of the canceller 11 is absorbed by relative inclination of the joint 17, and the displacement due to the inclination of the canceller 11 as shown in FIG. 9(*b*) will not occur. However, because both the rotation axes at the driving side and at the driven side intersect at an angle of intersection, a difference in the angular velocity (a rotation error) occurs between the two rotation axes, but the error is very small (the error of the rotation angle is ±0.00152° at an inclination of the canceller 11 of 0.059°).

As described above, because the rotary connector 100 is provided with the first universal joint 19 and the second universal joint 21, it is only an inclination of the driving shaft (the canceller 11) or the driven shaft (the rotator 15 of the steering angle sensor 13) that affects the rotation angle error.

In actually assembling the rotary connector 100, it is presumed that the inclination of the driving shaft or the driven shaft, and an axial deviation between the driving shaft and the driven shaft are combined. An example of operations for absorbing these inclination and axial deviation in the rotary connector 100 according to this embodiment will be described.

Figure 14:
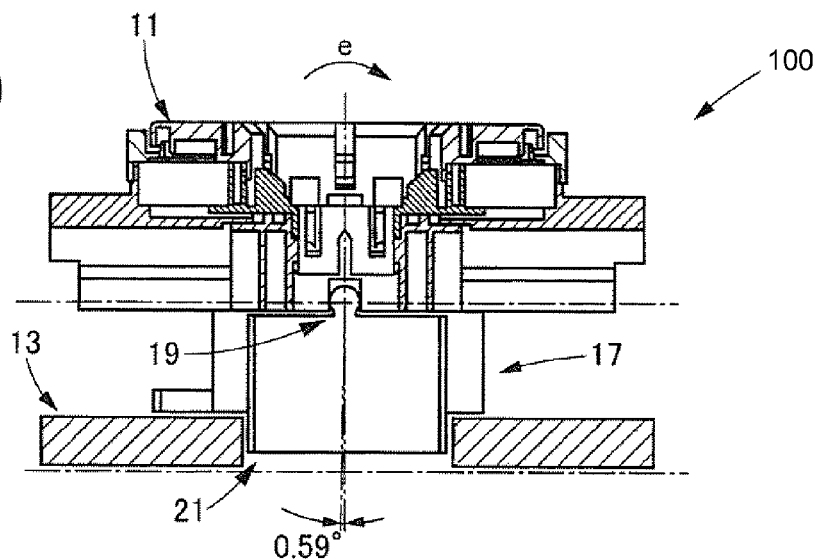
FIG. 14(a) is a vertical sectional view in a state where only the rotary body is inclined, (b) is a vertical sectional view in a state where the rotary body is inclined, while the rotator is axially deviated to the left, and (c) is a vertical sectional view in a state where the rotary body is inclined, while the rotator is axially deviated to the right.
Figure 14:
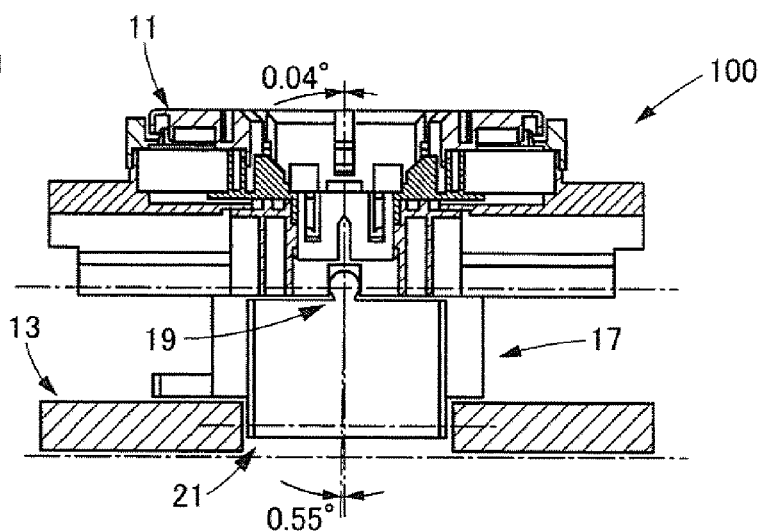
Figure 14:
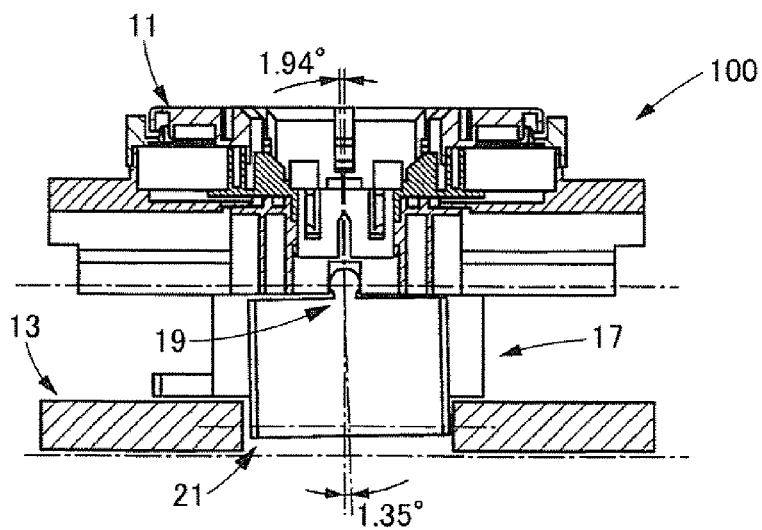

FIG. 14(*a*) is a vertical sectional view in a state where only the rotary body is inclined, (*b*) is a vertical sectional view in a state where the rotary body is inclined, while the rotator is axially deviated to the left, and (*c*) is a vertical sectional view in a state where the rotary body is inclined, while the rotator is axially deviated to the right.

The case where only the canceller 11 is inclined in a direction of an arrow mark e, and an angle of intersection between the driving shaft and the driven shaft is 0.059° is shown in FIG. 9(*a*).

In case where the canceller 11 is inclined by 0.04°, and the steering angle sensor 13 is displaced to the left by 0.55° as shown in FIG. 14(*b*), the angle of intersection between the driving shaft and the driven shaft is 0.04°+0.55°=0.059° in the same manner.

Moreover, in case where the canceller 11 is inclined by 1.94°, and the steering angle sensor 13 is displaced to the right by 1.35°, as shown in FIG. 14(*c*), an angle of intersection between the driving shaft and the driven shaft is 1.94°−1.35°=0.059° in the same manner.

Figure 15:
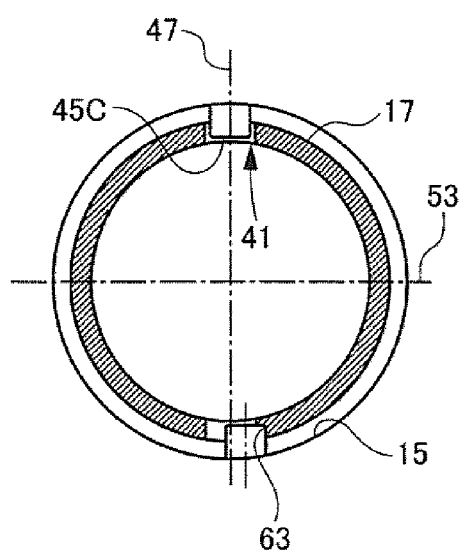
FIG. 15(a) is a cross sectional view of the joint and the rotator in which the shaft parts are angled pins, and (b) is a cross sectional view of the joint and the rotator in which R faces are formed in the shaft parts.
Figure 15:
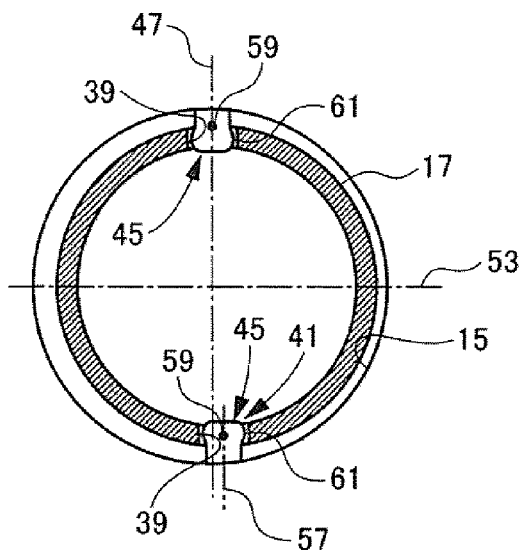
Figure 16:
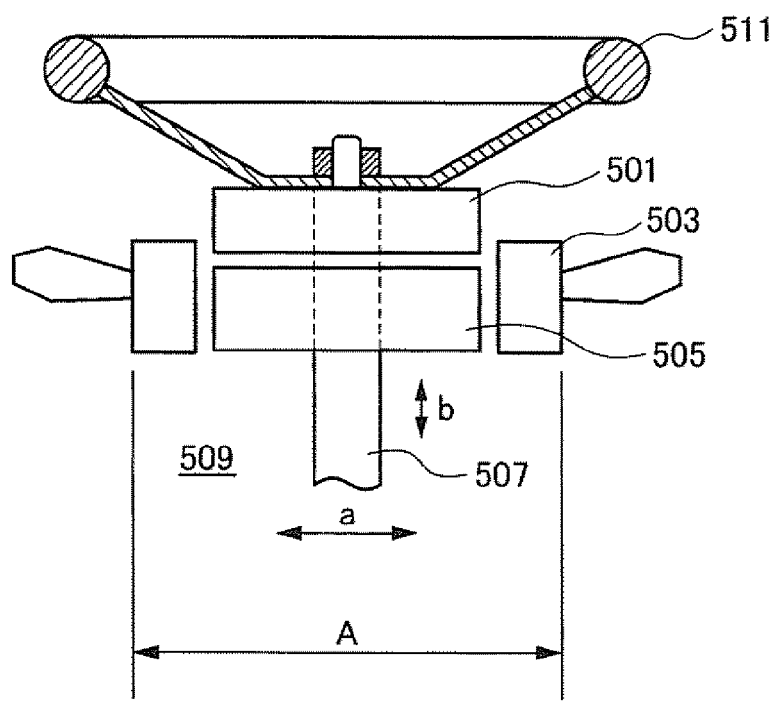
FIG. 16 is a side view showing an area surrounding a steering shaft in the prior art, provided with various instruments.

FIG. 15(*a*) is a cross sectional view of the joint and the rotator in which the shaft parts are angled pins, and (*b*) is a cross sectional view of the joint and the rotator in which R faces are formed in the shaft parts.

As shown in FIG. 15(*b*), in the rotary connector 100, an R face (a spherical faces in an annular shape) 61 is formed on an outer periphery of each of the shaft parts 45 at an equal distance from a certain point 59 on an axis 57 of the shaft part 45. The shaft part 45 is in contact with the bearing faces 39, 39 at this R face 61.

In case where the shaft parts are equal diameter pins 45C, for example, as shown in FIG. 15(*a*), displacement of the joint 17 is restricted by occurrence of an interference 63 in an inner peripheral space of the rotator 15 around one of the shaft parts 45. Accordingly, it is necessary to enlarge a clearance at the other bearing part 41, while will be a factor of the rotation angle error.

On the other hand, according to the rotary connector 100, the bearing faces 39 of the bearing parts 41 of the joint can slide along the R faces 61 of the shaft parts 45, 45, as shown in FIG. 15(*b*), and the joint 17 can be displaced at an inner periphery of the rotator 15 in a direction of becoming eccentric with respect to the center of the rotator. In this manner, it is possible to eliminate the interference 63 during the displacement, which occurs in case where the shaft parts 45 are the angled pins or the equal diameter pins 45C. As the results, it becomes unnecessary to enlarge the clearance for the purpose of avoiding the interference, and occurrence of the rotation angle error can be eliminated.

As described above, in the rotary connector 100, when the axial deviation occurs between the canceller 11 and the rotator 15, the canceller 11 and the joint 17 are connected at a certain angle of intersection by means of the first universal joint 19, and the joint 17 and the rotator 15 are connected at an opposite angle of intersection by means of the second universal joint 21. In this manner, even though the axial deviation occurs, both the rotation axes of the canceller 11 and the rotator 15 become parallel to each other, and a difference in the angular velocity (the rotation error) comes to zero.

Therefore, according to the above described rotary connector 100, it is possible to eliminate the rotation error between the canceller 11 and the rotator 15, even though the axial deviation has occurred between the canceller 11 and the rotator 15, because the canceller 11 is coupled to the rotator 15 by way of the joint 17, the canceller 11 is connected to the joint 17 by means of the first universal joint 19, and at the same time, the joint 17 is connected to the rotator 15 by means of the second universal joint 21.

What is claimed is:

1. A rotary connector, comprising:
    an annular rotary body having a first rotational axis and disposed outside a steering shaft and integrally rotated with a steering wheel;
    a rotator of a steering angle sensor having a second rotational axis and disposed outside the steering shaft, wherein the steering angle sensor is configured to measure a steering angle of the shaft; and
    a tubular joint having a third rotational axis disposed outside the steering shaft and connecting the rotary body to the rotator;
    wherein the rotary body and the tubular joint are connected together by a first universal joint configured to provide relative angular displacement of the first rotational axis of the rotary body with respect to the third rotational axis of the tubular joint, and the tubular joint and the rotator are connected together by a second universal joint configured to provide relative angular displacement of the second rotational axis of the rotator with respect to the third rotational axis of the tubular joint such that rotational error between the rotary body and the rotator is reduced.

2. The rotary connector as claimed in claim 1, wherein:
    the first universal joint includes:
    opposed walls provided near an outer periphery of the rotary body at both ends of the rotary body in a diametrical direction, extending in parallel in a direction along an axis of the rotary body;
    sliding contact projections respectively formed between the opposed walls,
    a pair of clamping pieces, provided inside an end side of the tubular joint, at both ends in a diametrical direction, and respectively clamping the sliding contact projections from outside, and
    disc-shaped parts, formed in proximity of the clamping pieces, and adapted to be engaged between the opposed walls in parallel to each other.

3. The rotary connector as claimed in claim 2, wherein sliding contact faces of the sliding contact projections and clamping faces of the clamping pieces are formed in a spherical shape.

4. The rotary connector as claimed in claim 1, wherein the second universal joint includes:
    bearing parts, provided inside an end side of the tubular joint, at both ends in a diametrical direction, and respectively having bearing faces in parallel which are cut out in an axial direction of the tubular joint, and a pair of shaft parts, provided on an inner peripheral face of the rotator so as to project inward from both ends in a diametrical direction, and adapted to be engaged with the bearing parts.

5. The rotary connector as claimed in claim 4, wherein:

a spherical face is formed on an outer periphery of each of the shaft parts at an equal distance from a certain point on the axis, and the shaft part is brought into contact with the bearing face at the spherical face.

6. The rotary connector of claim 1, wherein the first universal joint includes means for allowing relative angular displacement between the rotary body and the tubular joint with respect to each other about two axes disposed perpendicular to each other.

7. The rotary connector of claim 1, where the second universal joint includes means for allowing relative angular displacement between the rotator and the tubular joint about two axes disposed perpendicular to each other.

* * * * *